United States Patent [19]

Higashi

[11] Patent Number: 5,439,277

[45] Date of Patent: Aug. 8, 1995

[54] ANTI-SKID BRAKE CONTROL METHOD

[75] Inventor: Katsumi Higashi, Higashimatsuyama, Japan

[73] Assignee: Jidosha Kiki Co., Ltd., Tokyo, Japan

[21] Appl. No.: 293,167

[22] Filed: Aug. 19, 1994

Related U.S. Application Data

[63] Continuation of Ser. No. 984,683, Dec. 2, 1992, abandoned.

[30] Foreign Application Priority Data

Dec. 6, 1991 [JP] Japan .................. 3-322649

[51] Int. Cl.$^6$ .............................................. B60T 13/68
[52] U.S. Cl. ............................. 303/113.1; 303/118.1
[58] Field of Search ................ 303/93, 94, 95, 96, 303/100, 102, 103, 110, 118.1, 113.1; 364/426.02

[56] References Cited

U.S. PATENT DOCUMENTS

| | | | |
|---|---|---|---|
| 3,937,527 | 2/1976 | Eckhart | 303/118.1 |
| 3,944,290 | 3/1976 | Goebels et al. | 303/118.1 |
| 4,025,127 | 5/1977 | Rembold | 303/118.1 |
| 4,080,077 | 3/1978 | Acker et al. | 303/100 X |
| 4,576,419 | 3/1986 | Leiber | 303/100 |
| 4,997,236 | 3/1991 | Naito et al. | 303/100 X |
| 5,133,593 | 7/1992 | Woerner | 303/118.1 |

*Primary Examiner*—Robert J. Oberleitner
*Assistant Examiner*—Lee W. Young
*Attorney, Agent, or Firm*—Varndell Legal Group

[57] ABSTRACT

In the anti-skid brake control method of the present invention, braking pressure is controlled in such manner that it is transferred to pressure holding after it has been decreased for a predetermined time $t_1$ when it is transferred from pressure increase to pressure holding during anti-skid brake control. Thus, the braking pressure held at a constant level can be maintained to a pressure approximately equal to the desired preset holding pressure. Therefore, the tendency of wheels to be locked can be prevented. As the result, the controllability of the anti-skid brake control can be improved without changing hardware arrangement of the relay valve and the like.

8 Claims, 2 Drawing Sheets

[ABS control]

ANTI-SKID BRAKE CONTROL METHOD

This application is a continuation of U.S. Ser. No. 07/984,683, filed Dec. 2, 1992, now abandoned.

BACKGROUND OF THE INVENTION

The present invention relates to a method of anti-skid brake control for controlling skid of wheels by repeatedly decreasing, holding and increasing braking pressure during braking operation.

In general, anti-skid brake control is performed, when it is detected that wheels tend to be locked during braking, to eliminate the locking tendency by decreasing braking force of the wheels and by increasing the braking force again thereafter in order to stabilize driving of the vehicle and to make the braking distance as short as possible.

One of conventional type general anti-skid brake control systems is explained by FIG. 3.

As shown in FIG. 3, a brake control circuit, for which the above anti-skid brake control system is applied, comprises a brake valve 1 operated by a driver, an air tank 2 where compressed air is accummulated by an air compressor (not shown), a relay valve 3 for supplying the compressed air of the air tank 2 to a brake chamber when brake signal air pressure is sent from the brake valve 1, a holding valve 4 consisting of a permanently open solenoid valve mounted in an air passage between the brake valve 1 and the relay valve 3, an exhaust valve 5 consisting of a permanently closed solenoid valve mounted in an air passage between the holding valve 4 and the relay valve 3, a check valve 6 mounted in an air passage between the brake valve 1 and the relay valve 3 by bypassing the holding valve 4 and allowing only the air to pass from the relay valve 3 to the brake valve 1, and a controller 7 for controlling opening and closing of the holding valve 4 and the exhaust valve 5.

When the driver opens the brake valve 1 to brake when the vehicle is driven, brake signal air pressure by compressed air of the air tank 2 is sent into a pilot chamber of the relay valve 3, and the relay valve 3 is switched to a position to communicate the air tank 2 with the brake chamber. Then, the compressed air of the air tank 2 is introduced into the brake chamber, and brake is operated. In this case, braking pressure gradually increases as shown in FIG. 4. During braking, a controller 7 computes wheel deceleration based on wheel speed as supplied and, by detecting that the computed wheel deceleration reaches a threshold value $\alpha$, judges that the wheels are being locked. Then, the holding valve 4 is turned on, and it is closed. As the result, the supply of the brake signal air pressure to the relay valve 3 is stopped, and the relay valve 3 stands at neutral position, and the brake chamber is shut off from the air tank 2 and exhaust outlet. As the result, braking pressure is maintained at approximately constant level.

Even when this braking pressure is maintained, if the controller 7 detects that the wheel deceleration gradually increases and reaches the threshold value $\beta$, it judges that the wheels are locked. Thus, exhaust valve 5 is turned on and is opened. As the result, the compressed air, i.e. the brake signal air pressure supplied to the relay valve 3, is discharged, and the relay valve 3 communicates the brake chamber with the exhaust outlet. As the result, the compressed air in the brake chamber is discharged, and braking pressure is reduced.

When the braking pressure is reduced, wheel deceleration is decreased. The controller 7 judges that the wheels tend to be locked when it is detected that wheel deceleration reaches the threshold value $\gamma$. Thus, the exhaust valve 5 is turned off and is closed. Then, the discharge of the compressed air supplied to the pilot chamber of the relay valve 3 is stopped. The relay valve 3 is at neutral position, and the brake chamber is shut off from the air tank 2 and the exhaust outlet. As the result, the braking pressure is maintained at approximately constant level.

After the braking pressure is turned to the holding state, if it is detected that the wheel deceleration is decreased and reaches the threshold value $\delta$, the controller 7 judges that the locking tendency has been eliminated. Thus, the holding valve 4 is turned off and is opened. Then, the compressed air is supplied to the relay valve 3 as brake signal air pressure, and the relay valve 3 communicates the air tank 2 with the brake chamber. As the result, the compressed air is introduced into the brake chamber, and the braking pressure is again increased.

As described above, anti-skid brake control is performed by repeatedly increasing, holding, decreasing, holding and increasing the braking pressure.

However, when braking pressure is controlled from pressure increase to pressure holding, braking pressure is overshot due to operation characteristics such as responsiveness of the relay valve 3. Braking pressure is not maintained in the preset holding pressure during pressure holding as shown by broken line in FIG. 1, and it is held at higher pressure than the preset holding pressure. For this reason, the wheels are now more easily locked. This overshooting is particularly high during the first control from pressure increase to pressure holding after starting braking operation, and it is relatively low for the second time and after because it is already under anti-skid brake control.

During the control from pressure decrease to pressure holding, braking pressure is often undershot. Under pressure holding condition as shown by broken line in FIG. 2, braking pressure is not held at the preset holding pressure and it is held at lower pressure than the preset holding pressure. Thus, the restoration of wheel deceleration is delayed, and the braking distance becomes longer.

As described above, in the conventional anti-skid brake control, controllability is not always satisfactory due to operating characteristics of the relay valve.

SUMMARY OF THE INVENTION

It is an object of the present invention to provide a method for anti-skid brake control, by which it is possible to improve the controllability of anti-skid brake control without changing system arrangement such as relay valve.

To attain the above object, the anti-skid brake control method according to the present invention controls braking pressure when a tendency of wheels to skid is detected during braking, and it is characterized in that, when braking pressure is transferred at least from said pressure increase to pressure holding, braking pressure is transferred to pressure holding after it has been decreased for once.

Also, the anti-skid brake control method of the present invention is to control braking pressure when a tendency of wheels to skid is detected during braking, and it is characterized in that, when at least braking pressure is transferred from pressure decrease to pressure holding, the braking pressure is transferred to pressure holding after it has been increased.

Further, the anti-skid brake control method of the invention is to control braking pressure when a tendency of wheels to skid is detected during braking, and it is characterized in that, braking pressure is transferred to pressure holding after it has been decreased when said braking pressure is transferred from pressure increase to pressure holding, and braking pressure is transferred to pressure holding after it has been increased when said braking pressure is transferred from pressure decrease to pressure holding.

In the anti-skid brake control method of the present invention with the above arrangement, braking pressure is controlled in such manner that it is transferred to pressure holding after it has been decreased when braking pressure is controlled from pressure increase to pressure holding. As the result, the braking pressure maintained at a constant level is held at a pressure approximately equal to the desired preset holding pressure. Thus, the tendency of wheels to be locked can be prevented.

Also, in the anti-skid brake control method of the present invention, braking pressure is controlled in such manner that it is transferred to pressure holding after it has been increased for once when braking pressure is controlled from pressure decrease to pressure holding during anti-skid brake control. Thus, the braking pressure maintained at a constant level is held at a pressure approximately equal to the desired preset holding pressure. As the result, the delay in restoring deceleration can be prevented.

Further, in the anti-skid brake control method of the present invention, braking pressure is controlled in such manner that it is transferred to pressure holding after it has been decreased when the braking pressure is controlled from pressure increase to pressure holding during anti-skid brake control, and it is controlled in such manner that it is transferred to pressure holding after it has been increased when braking pressure is controlled from pressure decrease to pressure holding. Thus, the braking pressure maintained at a constant level is held to a pressure approximately equal to the desired preset holding pressure in case where braking pressure is transferred from pressure increase to pressure holding and in the case where it is transferred from pressure decrease to pressure holding. As the result, when it is transferred from pressure increase to pressure holding, the tendency of the wheels to be locked can be prevented, and the delay in restoring the deceleration can be prevented when it is transferred from pressure decrease to pressure holding.

Accordingly, it is possible by the present invention to provide stabilized driving and the better comfortableness, to shorten the stopping distance, and to improve controllability of the anti-skid brake control.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
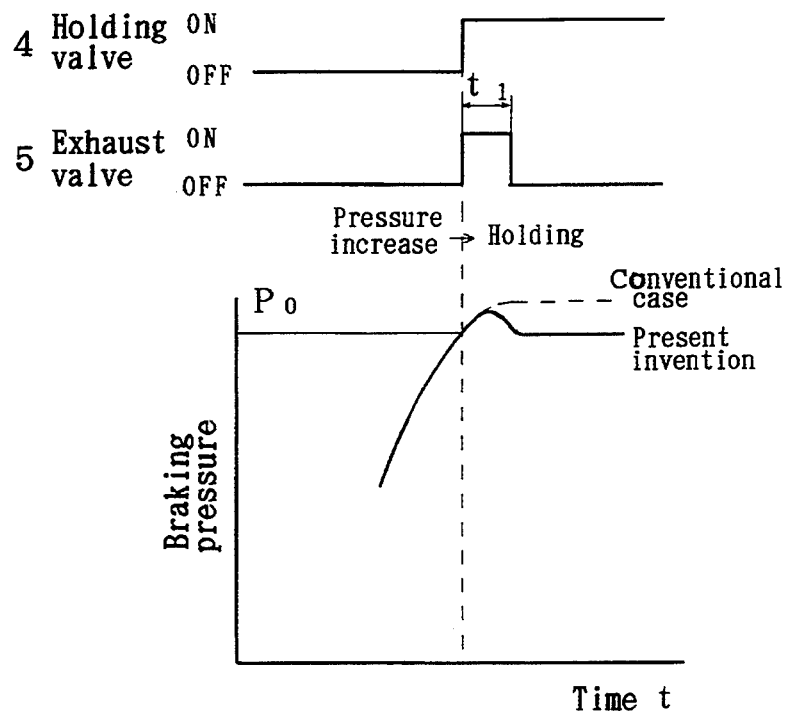
FIG. 1 is a diagram showing an embodiment of the anti-skid brake control method of the present invention.
Figure 3:
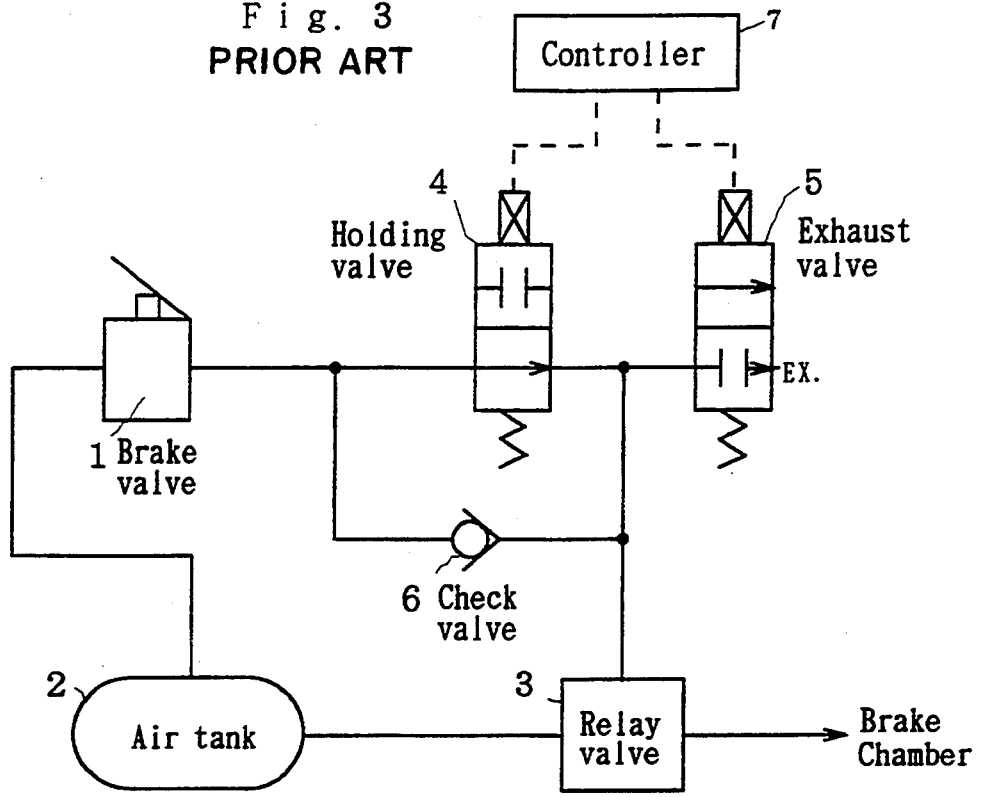
FIG. 3 is an arrangement of a conventional type anti-skid brake control system.
Figure 4:
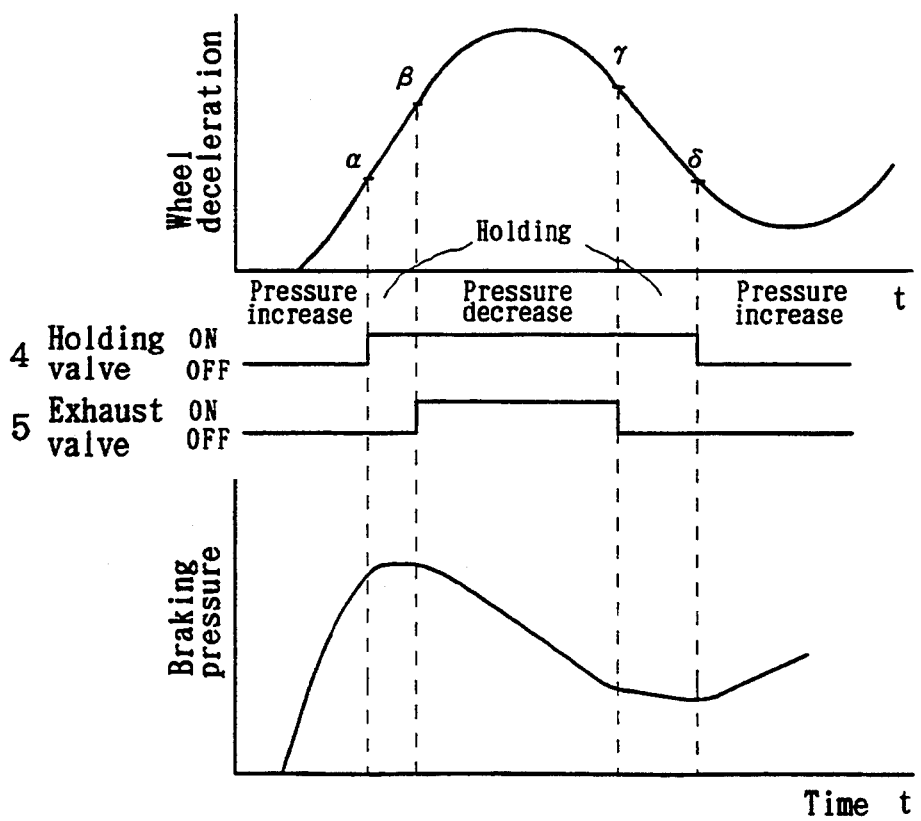
FIG. 4 is a diagram of an example of a conventional anti-skid brake control method.

FIG. 1 shows an embodiment of the anti-skid brake control method of the present invention, and this represents an anti-skid brake control method given in FIG. 4 and a part of the anti-skid brake control where braking pressure is controlled at least from pressure increase to pressure holding. Description is now given on the case where the anti-skid brake control method of this embodiment is applied to the anti-skid brake control system of FIG. 3, whereas it can be applied to an anti-skid brake control system of any arrangement if braking pressure can be controlled from pressure increase to pressure holding.

As shown in FIG. 1, when wheel deceleration reaches the threshold value $\alpha$ during braking, the controller 7 transfers braking pressure from pressure increase to pressure holding, and a holding valve 4 is turned on as in the conventional method. In the present embodiment, an exhaust valve 5 is turned on for a predetermined time $t_1$ at the same time, and it is then turned off. As soon as the holding valve 4 is closed, the exhaust valve 5 is opened only for the predetermined time $t_1$ and it is then closed. Accordingly, the supply of brake signal air pressure to a relay valve 3 is stopped, and the brake signal air pressure supplied to the relay valve 3 is discharged only for the predetermined time $t_1$. The relay valve 3 is switched over and communicates brake chamber to an exhaust outlet of the relay valve 3.

As the result, compressed air in the brake chamber is discharged from the exhaust outlet of the relay valve 3, and the braking pressure is decreased. In this case, the braking pressure is increased due to overshoot for a while after the holding valve 4 is turned on as shown by solid line in FIG. 1 and it is then decreased. After the predetermined time $t_1$ has elapsed, the exhaust valve 5 is closed and the discharge of the brake signal air pressure is stopped. Then, the relay valve 3 stands at neutral position, shutting off the brake chamber from the air tank 2 and the exhaust outlet. As the result, the braking pressure is maintained almost at a constant level. Thus, in the present embodiment, braking pressure is controlled in such manner that braking pressure is transferred to pressure holding after it has been decreased during the control of the braking pressure from pressure increase to pressure holding.

Meanwhile, the braking pressure maintained at a constant level in the present embodiment as shown by solid line in FIG. 1 is turned to a pressure approximately equal to the braking pressure at the time when the holding valve 4 is turned on. That is, in the conventional control of the braking pressure from pressure increase to pressure holding, the braking pressure is held at a pressure higher than the desired preset holding pressure due to overshoot as given by broken line, while, in the present embodiment, it is held at a pressure approximately equal to the desired preset holding pressure $P_0'$. As the result, the tendency of wheels to be locked can be prevented. Such control of braking pressure from pressure increase to pressure holding is performed in anti-skid brake control where at least the braking pressure is transferred from pressure increase to pressure holding, such as anti-skid brake control shown in FIG. 4. In this case, the predetermined time $t_1$ for turning the exhaust valve 5 on, i.e. pressure decrease time, can be set to various desired values. For example:

(1) Pressure decrease time is set in advance to a certain time. In this case, pressure decrease is performed based on the preset time when it is transferred from pressure increase to pressure holding, and brake control can be simplified.

(2) Pressure decrease time is adjusted by the time from braking start to pressure holding. In this case, pressure decrease time is adjusted by the time from braking start to holding when it is transferred from pressure increase to pressure holding during anti-skid brake control. Thus, pressure decrease is performed depending upon running road condition, and the brake control to match the running road condition is carried out. In particular, overshoot of the braking pressure is high during the first control of braking pressure from pressure increase to pressure holding after braking start. Thus, this brake control is much more effective.

(3) Pressure decrease time is adjusted by the preceding pressure increase time. In this case, pressure decrease time is adjusted by the preceding pressure increase time when it is transferred from pressure increase to pressure holding during anti-skid brake control. Pressure decrease is performed exactly to match the running road condition, and brake control is carried out correctly according to the running road condition. In this case, pressure decrease time may sometimes be 0.

Figure 2:
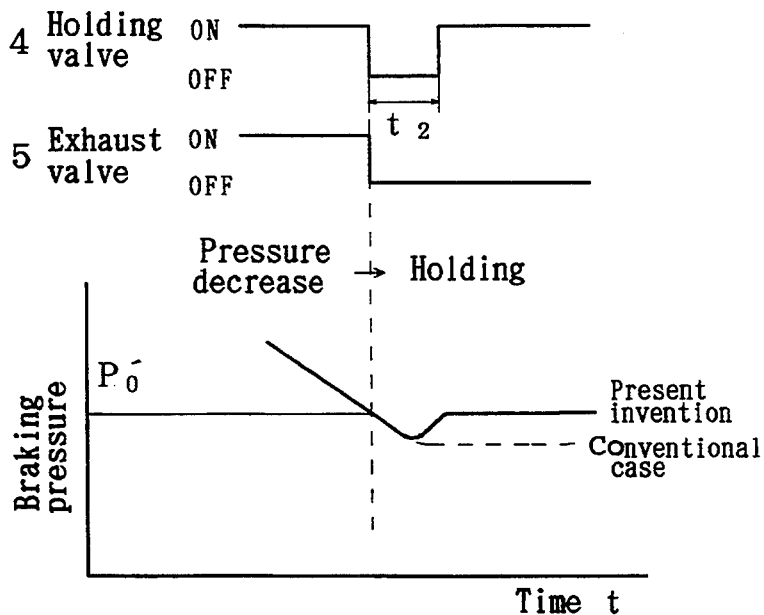
FIG. 2 is a diagram showing another embodiment of the anti-skid brake control method of the present invention.

FIG. 2 is a diagram similar to FIG. 1, showing another embodiment of the present invention.

As shown in FIG. 2 when wheel deceleration reaches the threshold value $\gamma$ during braking, the controller 7 turns the exhaust valve 5 off as in the conventional method to transfer the braking pressure from pressure decrease to pressure holding. In the present embodiment, the holding valve 4 is turned off for the predetermined time $t_2$ at the same time, and it is then turned on. Thus, as soon as the exhaust valve 5 is closed, the holding valve 4 is opened for the predetermined time $t_2$ and is then closed. Therefore, the discharge of the brake signal air pressure from the relay valve 3 is stopped, and at the same time, the brake signal air pressure is supplied to the relay valve 3 for the predetermined time $t_2$. The relay valve 3 is switched over, communicating the air tank 2 with the brake chamber.

As the result, the compressed air is introduced into the brake chamber, and braking pressure is increased. In this case, braking pressure is decreased due to undershoot for a while after the exhaust valve 5 has been turned on as shown by solid line in FIG. 2, and it is then increased. After the predetermined time $t_2$ has elapsed, the holding valve 4 is closed and the supply of the brake signal air pressure is stopped, the relay valve 3 stands at neutral position, shutting off the brake chamber from the air tank 2 and the exhaust outlet of the relay valve 3. As the result, the braking pressure is maintained almost at a constant level. Thus, in the present embodiment, braking pressure is controlled in such manner that it is transferred to pressure holding after it has been increased during the brake pressure control from pressure decrease to pressure holding.

Meanwhile, the braking pressure maintained at a constant level in the present embodiment as shown by solid line in FIG. 2 is approximately equal to the braking pressure at the time when the exhaust valve 5 is turned off. That is, in the conventional type control from pressure decrease to pressure holding, the braking pressure is maintained at a pressure lower than the desired preset holding pressure due to undershoot as shown by broken line, while, in the present embodiment, it is maintained to a pressure approximately equal to the desired preset holding pressure. Thus, the delay in restoring the wheel deceleration can be prevented.

Such transfer of braking pressure from pressure decrease to pressure holding is performed in anti-skid brake control where at least braking pressure is transferred from pressure decrease to pressure holding, such as anti-skid brake control shown in FIG. 4. In this case, the predetermined time $t_2$ to turn the holding valve 4 off, i.e. pressure increase time, can be set to various values as desired. For example:

(1) Pressure increase time is set in advance to a certain time. In this case, pressure increase is performed according to the above certain time when it is transferred from pressure decrease to pressure holding during anti-skid brake control, and brake control is simplified.

(2) Pressure increase time is adjusted by the preceding pressure decrease time. In this case, pressure increase time is adjusted by the preceding pressure decrease time when it is transferred from pressure decrease to pressure holding during anti-skid brake control. Pressure increase is performed exactly to match the running road condition, and brake control is carried out correctly according to the running road condition. In this case, pressure increase time may sometimes be 0.

In the above embodiment, brake control of the invention is performed individually from pressure increase to pressure holding and from pressure decrease to pressure holding, while it is needless to say that the present invention can also be applied to the control from pressure increase to pressure holding and from pressure decrease to pressure holding during a single anti-skid brake control.

Also, in the above embodiment, description has been given on the case where the present invention is applied to a brake control system using compressed air, while the invention can also be applied to a brake control system using other operating fluid such as hydraulic oil.

As it is evident from the above description, it is possible according to the anti-skid brake control method of 0 the present invention to maintain braking pressure, held at a constant level in the holding mode, to a pressure approximately equal to the desired preset holding pressure when braking pressure is transferred from pressure increase to pressure holding or from pressure decrease to pressure holding without changing hardware arrangement such as relay valve in the conventional type brake control system. Therefore, when it is transferred from pressure increase to pressure holding during anti-skid brake control, the tendency of wheels to be locked can be prevented, and the delay in restoring deceleration can be prevented when it is transferred from pressure decrease to pressure holding. As the result, it is possible to provide stabilized driving and better comfortableness, to shorten the stopping distance, and to improve controllability of anti-skid brake control.

What we claim is:

1. A method of controlling brake pressure in a brake pressure control system during anti-skid brake control, wherein said brake pressure control system includes pressure fluid supplied to and discharged from a brake cylinder by a relay valve, said relay valve is operated and controlled by a signal pressure received from a brake valve during braking, and said signal pressure is controlled by a holding valve and exhaust valve, said method of controlling said brake pressure comprising the following steps:

increasing said brake pressure for braking while said holding valve is opened and said exhaust valve is closed;

detecting a tendency of wheels to skid during said increasing of said brake pressure;

transferring from said increasing brake pressure to holding of said brake pressure at a desired brake pressure by closing said holding valve; and adjusting said brake pressure before said holding thereof by opening said exhaust valve only for a period of time sufficient to compensate for overshooting of said desired holding pressure due to an occurrence of a delay in operation of said relay valve and thereby decreasing said brake pressure only for said period of time so that said holding of said brake pressure is carried out at said desired brake pressure.

2. The method of controlling brake pressure in a brake pressure control system during anti-skid brake control according to claim 1, wherein said period of time is set at a constant value.

3. The method of controlling brake pressure in a brake pressure control system during anti-skid brake control according to claim 1, wherein said period of time is set based on a time from the start of braking to said holding.

4. The method of controlling brake pressure in a brake pressure control system during anti-skid brake control according to claim 1, wherein said period of time is set based on a preceding period of time for said adjusting.

5. A method of controlling brake pressure in a brake pressure control system during anti-skid brake control, wherein said brake pressure control system includes pressure fluid supplied to and discharged from a brake cylinder by a relay valve, said relay valve is operated and controlled by a signal pressure received from a brake valve during braking, and said signal pressure is controlled by a holding valve and exhaust valve, said method of controlling said brake pressure comprising the following steps:

decreasing said brake pressure for braking while said holding valve is closed and said exhaust valve is opened;

detecting a wheel deceleration threshold value during said decreasing of said brake pressure;

transferring from said decreasing brake pressure to holding of said brake pressure at a desired brake pressure by closing said exhaust valve; and adjusting said brake pressure before said holding thereof by opening said holding valve only for a period of time sufficient to compensate for undershooting said desired holding pressure due to an occurrence of a delay in operation of said relay valve and thereby increasing said brake pressure only for said period of time so that said holding of said brake pressure is carried out at said desired brake pressure.

6. The method of controlling brake pressure in a brake pressure control system during anti-skid brake control according to claim 5, wherein said period of time is set at a constant value.

7. The method of controlling brake pressure in a brake pressure control system during anti-skid brake control according to claim 5, wherein said period of time is set based on a preceding period of time for decreasing of said brake pressure.

8. A method of controlling brake pressure in a brake pressure control system during anti-skid brake control, wherein said brake pressure control system includes pressure fluid supplied to and discharged from a brake cylinder by a relay valve, said relay valve is operated and controlled by a signal pressure received from a brake valve during braking, and said signal pressure is controlled by a holding valve and exhaust valve, said method of controlling said brake pressure comprising the following steps:

increasing said brake pressure for braking while said holding valve is opened and said exhaust valve is closed;

detecting a tendency of wheels to skid during said increasing brake pressure;

transferring from said increasing brake pressure to a first holding of said brake pressure at a first desired brake pressure by closing said holding valve;

adjusting said brake pressure before said first holding thereof by opening said exhaust valve only for a first period of time sufficient to compensate for overshooting of said first desired holding pressure due to an occurrence of a delay in operation of said relay valve and thereby decreasing said brake pressure only for said first period of time so that said first holding of said brake pressure is carried out at said first desired brake pressure;

decreasing said brake pressure for braking while said holding valve is closed and said exhaust valve is opened;

detecting a wheel deceleration threshold value during said decreasing brake pressure;

transferring from said decreasing brake pressure to a second holding of said brake pressure at a second desired brake pressure by closing said exhaust valve;

adjusting said brake pressure before said second holding thereof by opening said holding valve only for a second period of time sufficient to compensate for undershooting of said second holding pressure due to an occurrence of a delay in operation of said relay valve and thereby increasing said brake pressure only for said second period of time so that said second holding of said brake pressure is carried out at said second desired brake pressure.

* * * * *